US009197743B2

United States Patent
Sun (10) Patent No.: US 9,197,743 B2
(45) Date of Patent: Nov. 24, 2015

(54) VOIP GATEWAY DEVICE, CONTROL METHOD THEREOF AND VOIP

(71) Applicant: SAMSUNG ELECTRONICS CO., LTD., Suwon-si (KR)

(72) Inventor: Min-gyu Sun, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 13/724,508

(22) Filed: Dec. 21, 2012

(65) Prior Publication Data

US 2013/0163404 A1 Jun. 27, 2013

(30) Foreign Application Priority Data

Dec. 22, 2011 (KR) .................. 10-2011-0140278

(51) Int. Cl.
*H04L 29/06* (2006.01)
*H04M 3/42* (2006.01)

(52) U.S. Cl.
CPC ........... *H04M 3/42195* (2013.01); *H04L 29/06* (2013.01); *H04L 65/105* (2013.01); *H04L 65/1036* (2013.01); *H04L 65/1069* (2013.01); *H04M 2201/14* (2013.01)

(58) Field of Classification Search
USPC ................ 370/254, 259, 260, 351, 352, 356, 370/395.52; 379/69, 142.01, 207.02, 379/207.04, 207.16, 242, 265.01; 455/413, 455/414.1, 415, 417, 445, 456.1, 550.1
See application file for complete search history.

(56) References Cited

U.S. PATENT DOCUMENTS

| | | | | |
|---|---|---|---|---|
| 6,088,436 A | * | 7/2000 | Mashinsky | 379/210.01 |
| 6,252,949 B1 | * | 6/2001 | Chishaki et al. | 379/100.14 |
| 6,681,006 B1 | * | 1/2004 | Pilkington et al. | 379/210.01 |
| 2005/0289222 A1 | * | 12/2005 | Sahim | 709/206 |
| 2006/0187904 A1 | * | 8/2006 | Oouchi | 370/352 |
| 2006/0203985 A1 | * | 9/2006 | Beauford | 379/211.01 |
| 2007/0121874 A1 | * | 5/2007 | Holder et al. | 379/210.01 |
| 2008/0008157 A1 | * | 1/2008 | Edge et al. | 370/351 |
| 2008/0063168 A1 | * | 3/2008 | Haley et al. | 379/201.01 |
| 2008/0212764 A1 | * | 9/2008 | Fukuta et al. | 379/211.02 |
| 2011/0167152 A1 | | 7/2011 | Roach et al. | |

* cited by examiner

*Primary Examiner* — Michael Thier
*Assistant Examiner* — Prince A Mensah
(74) *Attorney, Agent, or Firm* — Sughrue Mion, PLLC (57) ABSTRACT

Provided are a Voice over Internet Protocol (VoIP) gateway device, a control method thereof, and a VoIP gateway system. The VoIP gateway device includes: a connector which is connected to a first terminal; a communication unit which communicates with a proxy server that relays a VoIP communication; a storage unit which stores a ringtone corresponding to a call received by a call back function; and a controller which transmits an invite message to the proxy server for connecting a call from a first terminal to a second terminal corresponding to the call back function upon request from the first terminal for the call back function, and transmits the stored ringtone to the first terminal upon receiving a ringing message from the proxy server in response to the invite message.

26 Claims, 6 Drawing Sheets

VOIP GATEWAY DEVICE, CONTROL METHOD THEREOF AND VOIP

CROSS-REFERENCE TO RELATED APPLICATION

This application claims priority from Korean Patent Application No. 10-2011-0140278, filed on Dec. 22, 2011 in the Korean Intellectual Property Office, the disclosure of which is incorporated herein by reference in its entirety.

BACKGROUND

1. Field

Apparatuses and methods consistent with exemplary embodiments relate to a Voice over Internet Protocol (VoIP) gateway device, a control method thereof, and a VoIP gateway system, and more particularly, to a VoIP gateway device, a control method thereof and a VoIP gateway system which provides a call back service.

2. Description of the Related Art

Figure 1:
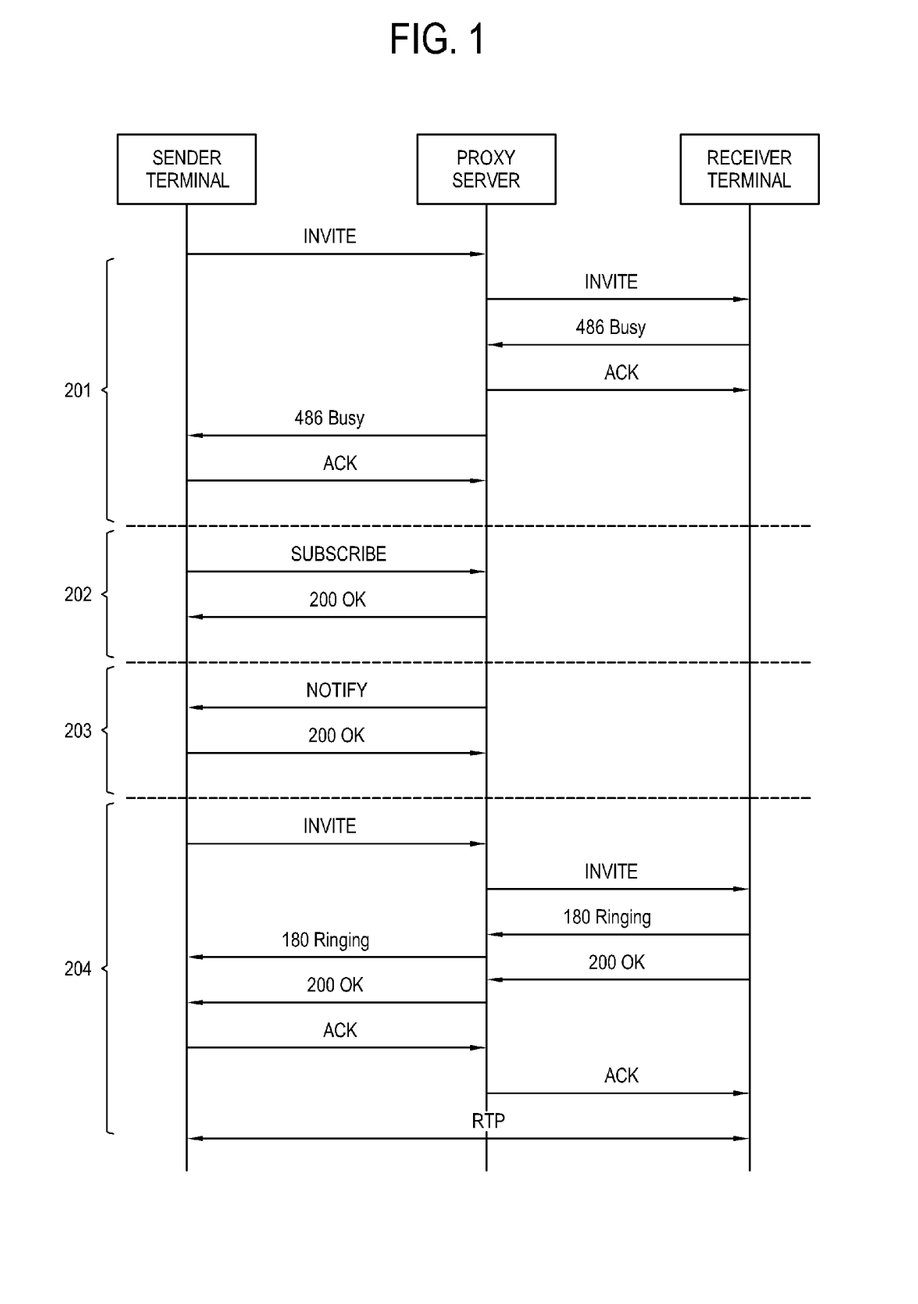
FIG. 1 is a control flowchart of a call back service in a related art VoIP system.

Voice over Internet Protocol (VoIP) relates to a set of communication service technologies which performs fax transmission/reception or voice calls such as telephone calls in a general telephone network (e.g., a Public Switched Telephone Network (PSTN)) by converting voice or fax data into a data packet of the Internet Protocol in a computer network. FIG. 1 illustrates a related art VoIP system. As shown therein, a sender terminal and a receiver terminal are VoIP terminals, and a proxy server relays VoIP communications between the sender terminal and the receiver terminal. If the sender terminal transmits an invite message to the proxy server to request a call connection to the receiver terminal, the proxy server transmits the invite message to the receiver terminal (201). If the receiver terminal is busy and unavailable to receive the call, the proxy server reports the same to the sender terminal (201). In this case, the sender terminal may register a call back service with the proxy server (202). Once the call back service is registered, the proxy server identifies the state of the receiver terminal and reports an available time to the sender terminal (203). In response to such a report, the sender terminal again transmits the invite message to the receiver terminal through the proxy server (204).

In the related art, to use the call back service which is provided for the case where a call connection requested by the sender is not available due to the receiver's circumstances, the proxy server should perform the call back function, or software of the proxy server should be changed. VoIP is based on session initiation protocol (SIP), according to which only a call service for a failure to connect an outgoing call is defined, but a call service for a failure to receive an incoming call is not defined. If the state of the receiver terminal is not identifiable at the time when the proxy server performs the call back function, notify ring timeout occurs and no report is made to the sender terminal.

SUMMARY

Accordingly, aspects of one or more exemplary embodiments provide a VoIP gateway device, a control method thereof and a VoIP gateway system which provides a call back function without changing software of a proxy server to thereby reduce load on the proxy server.

Aspects of one or more other exemplary embodiments provide a VoIP gateway device, a control method thereof and a VoIP gateway system which not only provides a call back function for a failure to request for an outgoing call but also provides a call back function for a failure to receive an incoming call.

Aspects of one or more other exemplary embodiments provide a VoIP gateway device, a control method thereof and a VoIP gateway system which provides a ringtone for a call received by a call back function to be distinguished from other general calls.

According to an aspect of an exemplary embodiment, there is provided a VoIP gateway device including: a connector which is connected to a first terminal; a communication unit which communicates with a proxy server that relays a VoIP communication; a storage unit which stores a ringtone corresponding to a call received by a call back function; and a controller which transmits an invite message to the proxy server for connecting a call from the first terminal to a second terminal corresponding to the call back function upon request from the first terminal for the call back function, and transmits the stored ringtone to the first terminal upon receiving a ringing message from the proxy server in response to the invite message.

The call back function may be a function which is requested by the first terminal if a call connection requested by the first terminal to the second terminal fails.

The call back function may be a function which is requested by the first terminal if a call is not made as a result of the first terminal's failure to respond to a request made by the second terminal for the call connection.

The stored ringtone may be different from a ringtone for a call generally received by the first terminal.

The controller may not transmit any message to the first terminal if the controller does not receive a ringing message in response to the invite message from the proxy server.

The controller may transmit the stored ringtone to the first terminal to report that the call back function is being performed if the invite message is transmitted to the proxy server.

According to an aspect of another exemplary embodiment, there is provided a VoIP system including: a proxy server which relays a VoIP communication; and a VoIP gateway device which includes a connector connected to a first terminal, a communication unit communicating with the proxy server, a storage unit storing a ringtone corresponding to a call received by the call back function, and a controller transmitting an invite message to the proxy server to connect a call from the first terminal to a second terminal corresponding to the call back function upon request from the first terminal for the call back function, and transmitting the stored ringtone to the first terminal upon receiving a ringing message from the proxy server in response to the invite message.

The call back function is requested by the first terminal if a call connection requested by the first terminal to the second terminal fails.

The call back function may be requested by the first terminal if a call is not made as a result of the first terminal's failure to respond to the request for the call connection by the second terminal.

The stored ringtone may be different from a ringtone for a call generally received by the first terminal.

The controller may not transmit any message to the first terminal if the controller does not receive the ringing message in response to the invite message from the proxy server.

The stored ringtone may be transmitted to the first terminal to report that the call back function is being performed if the invite message is transmitted to the proxy server.

According to an aspect of another exemplary embodiment, there is provided a control method of a VoIP gateway device, the control method including: storing a ringtone corresponding to a call received by a call back function; transmitting to a proxy server an invite message to connect a call from a first terminal to a second terminal corresponding to the call back function if the call back function is requested by the first terminal; and transmitting the stored ringtone to the first terminal if a ringtone message is transmitted by the proxy server in response to the invite message.

The call back function may be requested by the first terminal if the first terminal requests the call connection to the second terminal but the call connection is not made.

The call back function may be requested by the first terminal if a call connection is not made as the first terminal fails to respond to a request of the second terminal for the call connection.

The stored ringtone may be different from a ringtone for a call generally received by the first terminal.

The control method may further include transmitting the invite message to the proxy server until the ringing message is received, without transmitting any message to the first terminal, if the ringing message is not received from the proxy server in response to the invite message.

The control method may further include transmitting the stored ringtone to the first terminal to report that the call back function is being performed if the invite message is transmitted to the proxy server.

According to an aspect of another exemplary embodiment, there is provided a control method of a VoIP gateway device, the control method including: receiving, by the VoIP gateway device, a request from a first terminal for a call back function; and transmitting, to a proxy server that relays a VoIP communication between the first terminal and a second terminal, an invite message to connect a call, corresponding to a call back function, to the second terminal in response to the received request.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. Exemplary embodiments may be embodied in various forms without being limited to the exemplary embodiments set forth herein. Descriptions of well-known parts are omitted for clarity, and like reference numerals refer to like elements throughout.

Figure 2:
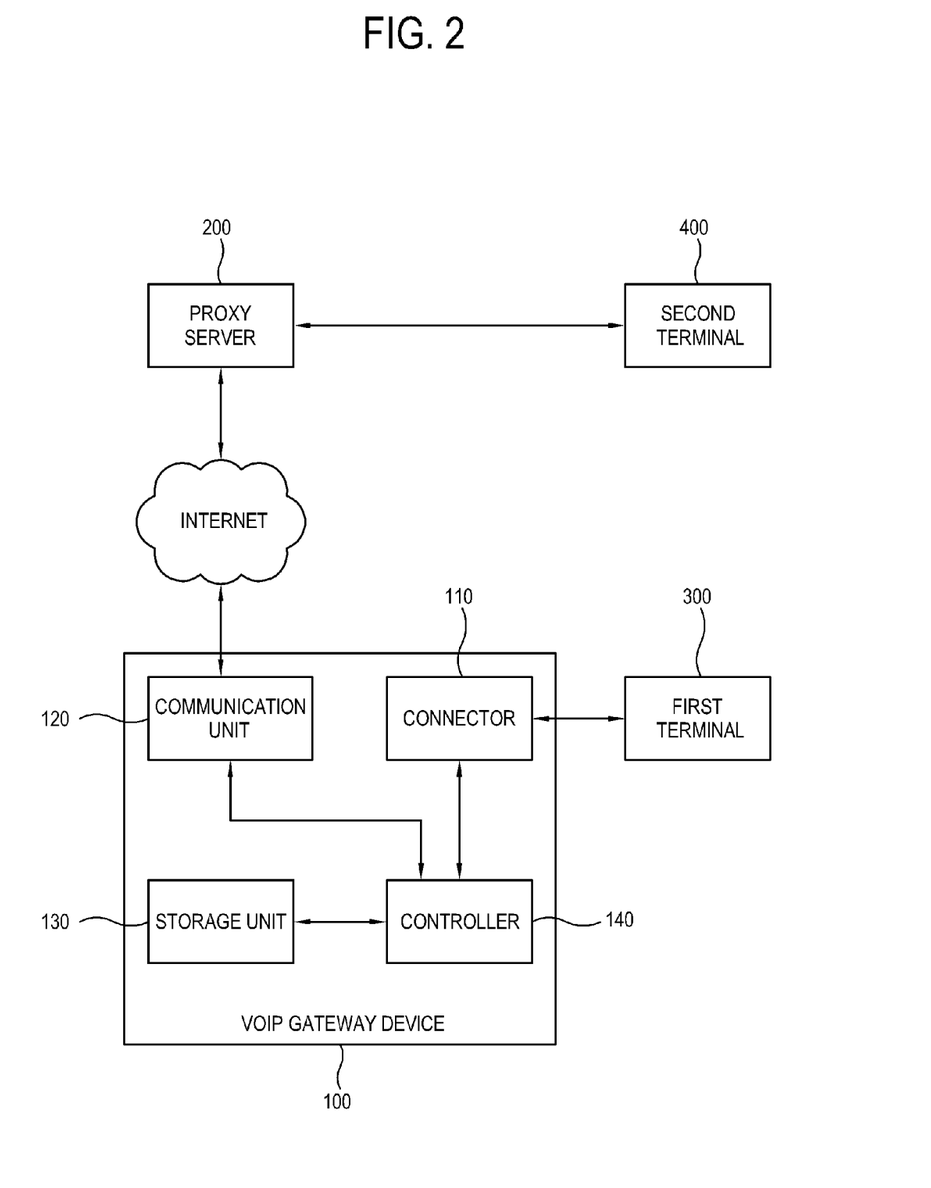
FIG. 2 is a block diagram of a VoIP system according to an exemplary embodiment.

FIG. 2 is a block diagram of a VoIP system according to an exemplary embodiment. As shown therein, the VoIP system includes a VoIP gateway device 100, a proxy server 200, a VoIP terminal 300 and a second terminal 400.

The VoIP gateway device 100 may process a call for VoIP communication according to session initiation protocol (SIP). The VoIP gateway device 100 according to the present exemplary embodiment may include a multimedia terminal adaptor (MTA) in a cable network, or an Internet access device (IAD) in an xDSL network to process the call for the VoIP communication. The MTA performs a conversion operation to convert a data signal into a voice signal, and enables a normal telephone to perform VoIP communication. As a kind of asymmetric digital subscriber line (ADSL) modem, the IAD is a composition modem including an Ethernet port and provides VoIP, Voice over DSL (VoDSL), wireless, Bluetooth, packet loss concealment (PIC), and Home Phoneline Networking Alliance (HomePNA) services and has an Internet set-top box function. Accordingly, a user may use the IP communication service through the IAD.

The proxy server 200 relays communications between the receiver terminal and the sender terminal in the Internet network, and includes a protocol controller. The proxy server 200 may be realized as session initiation protocol (SIP)-proxy server or H.323-gate keeper, though it is understood that one or more other exemplary embodiments are not limited thereto. The proxy server 200 stores therein information of subscriber terminals, and relays communication between the sender terminal and the receiver terminal by using the information.

The first and second terminals 300 and 400 may be realized as VoIP telephones, normal telephones, mobile phones, computers, tablets, etc. The VoIP telephone is used for a voice call through VoIP communication. The VoIP telephone may be realized as a PC, a VoIP exclusive telephone, a video phone, or a monitor having a video phone function. Otherwise, hardware and software modules for VoIP communication may be installed in a PC, which is connected to the Internet phone.

As described above with reference to FIG. 1, a related art VoIP terminal should register a call back service for a failure to connect a call with the related art proxy server, adding load on the related art proxy server. Failure to connect a call via the call back service due to continued telephone calls of the second terminal 400 may cause a ring timeout, and the related art proxy server does not subsequently provide the call back function. The related art proxy server defines only the call back function for an outgoing call, but does not define an incoming call back function.

The VoIP gateway device 100 according to the present exemplary embodiment solves the problem of the related art proxy server. The call back function of the VoIP terminal 300 is registered with the VoIP gateway device 100 instead of the proxy server 200. As the VoIP gateway device 100 leads the performance of the call back function, the proxy server 200 has a reduced load as the proxy server 200 relays VoIP communication without managing a call back function. The VoIP gateway device 100 according to the present exemplary embodiment provides a call back function for a failure to receive an incoming call as well as a call back function for a failure to request for an outgoing call, thereby enhancing a user's convenience. The VoIP gateway device 100 according to the present exemplary embodiment transmits, to the VoIP terminal 300, a ringtone that is different from a ringtone for calls generally received by the terminal 300 to thereby notify a user of a call received by the call back function.

Hereinafter, the VoIP gateway device 100 according to the present exemplary embodiment will be described in more detail.

The VoIP gateway device 100 includes a connector 110, a communication unit 120, a storage unit 130, and a controller 140.

The connector 110 is connected to the first terminal 300 and processes an outgoing call or an incoming call from the first terminal 300 by VoIP communication.

The communication unit 120 communicates with the proxy server 200 which relays the VoIP communication. The communication unit 120 may communicate with the proxy server 200 via the Internet or cable modem termination system (CMTS). The CMTS converts cable modem data into a data packet for transmission via the Internet, and is capable of communicating with the proxy server 200 via the Internet. If communication is performed via the CMTS, the communication unit 120 is realized as a radio frequency (RF) cable interface and receives voice or a fax packet through the CMTS and transmits the received packet to the first terminal 300. The CMTS may be a head-end device that is compatible with data over cable interface specification (DOCSIS) 3.0.

The storage unit 130 stores therein a ringtone corresponding to a call received by the call back function. The ringtone corresponding to the call received by the call back function is different from a ringtone corresponding to an incoming call that is received generally. Accordingly, through the ringtone, a user may identify whether a received call is a general incoming call or a call received by the call back function. This enhances the user's convenience.

The storage unit 130 stores therein not only the ringtone, but also various types of other tones. The other tones may include a dial tone which is heard when a receiver is picked up, a ring back tone which is provided to inform a caller that a ringing tone signal is transmitted to the receiver upon request for an outgoing call, and a busy tone which is provided to inform a caller that a receiver is on the phone upon request for an outgoing call.

Upon request from the first terminal 300 for a call back function, the controller 140 transmits an invite message to the proxy server 200 to connect a call to the second terminal 400 to which the first terminal 300 desires to connect the call, corresponding to the call back function. Upon receiving a ringing message from the proxy server 200 corresponding to the invite message, the controller 140 transmits the stored ringtone to the first terminal 300. The control operation of the controller 140 will be described in detail with reference to FIGS. 3 to 6.

Upon receiving a request for a call back function for the failure to make an outgoing call of the first terminal 300, the controller 140 may have the following default values as environment variables to perform the call back function.

TABLE 1

| Name | Syntax | Default value |
| --- | --- | --- |
| FeaturesAutoRedialInterval | Integer | 15 (sec) |
| FeaturesAutoRedialTimeout | Integer | 1800 (sec) |
| FeaturesAutoRedialNotiFingTimeout | Integer | 10 (sec) |
| FeaturesVscAutoRedialActive | String | *66 |
| FeaturesVscAutoRedialDeactive | String | *86 |
| FeaturesAdminStatusAutoRedial | Integer | 0 |
| FeaturesAutoRedialNotiUserFirst | Integer | 0 |

Upon receiving a request for a call back function for the failure to receive an incoming call of the first terminal 300, the controller 140 may have the following default values as environment variables to perform the call back function.

TABLE 2

| Name | Syntax | Default value |
| --- | --- | --- |
| FeaturesAutoRedialInterval | Integer | 15 (sec) |
| FeaturesAutoRedialTimeout | Integer | 1800 (sec) |
| FeaturesAutoRedialNotiFingTimeout | Integer | 10 (sec) |
| FeaturesVscAutoRedialActive | String | *69 |
| FeaturesVscAutoRedialDeactive | String | *89 |
| FeaturesAdminStatusAutoRedial | Integer | 0 |
| FeaturesAutoRedialNotiUserFirst | Integer | 0 |

FeaturesAutoRedialInterval defines an interval at which the VoIP gateway device 100 tries to make a redial to the second terminal 400 in response to the request for the call back function by a control of the controller 140. In the present exemplary embodiment, 15 seconds is set as a default value, though it is understood that this value may vary in other exemplary embodiments. FeaturesAutoRedialTimeout defines the maximum time value for which the VoIP gateway device 100 does not tries to make a call by the call back function by a control of the controller 140. 1800 seconds is set as a default value in the present exemplary embodiment, though it is understood that this value may vary in other exemplary embodiments. FeaturesAutoRedialNotiFingTimeout is a time interval at which making a call is reported to the first terminal 300 by the call back function. If the value is 0, no report is made. If the value is 1, a timer is commenced after ringing. Ten seconds are set as a default value in the present exemplary embodiment, though it is understood that this value may vary in other exemplary embodiments. FeaturesVscAutoRedialActive defines vertical service code (VSC) to activate an automatic redial by the call back function. FeaturesAdminStatusAutoRedial defines a value set by a user to use the call back function. FeaturesAutoRedialNotiUserFirst defines the value which notifies that a call is sent by the call back function through the ringtone stored in the storage unit 130 to the first terminal 300 at the same time as an attempt to make a call to the second terminal 400 by the call back function.

Figure 3:
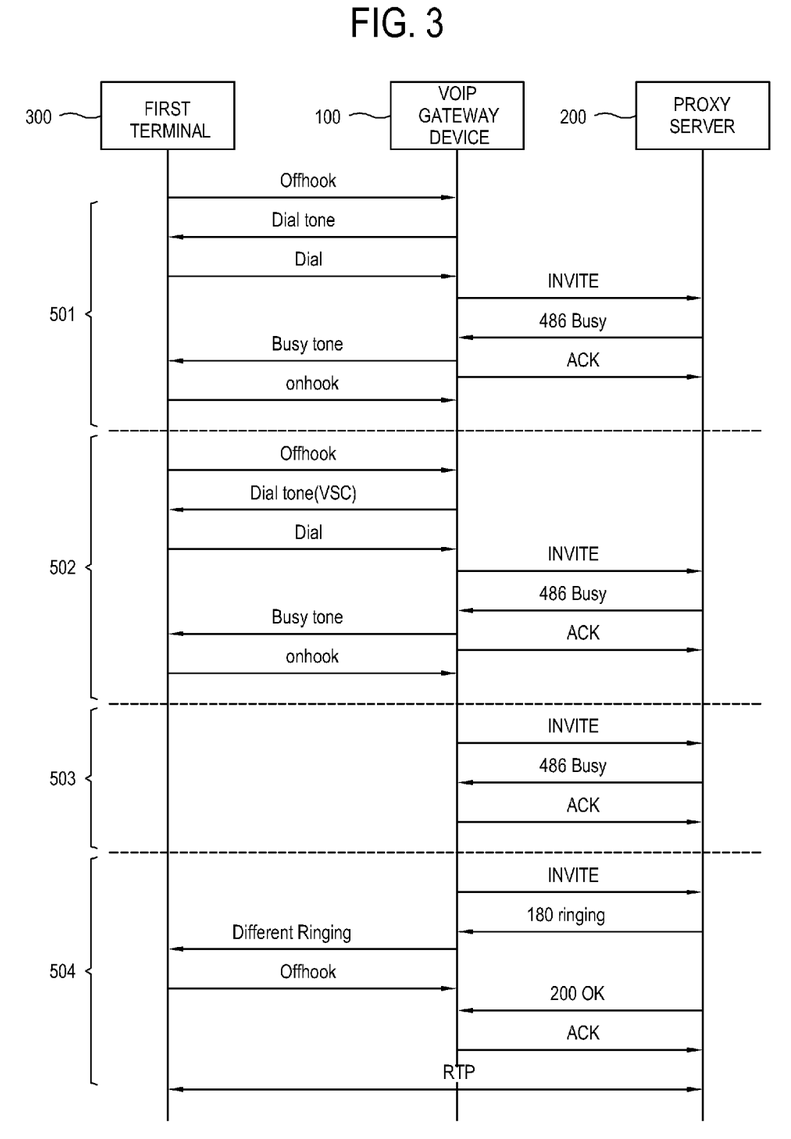
FIGS. 3 and 4 are flowcharts of a call back function for an outgoing call from a first terminal according to one or more exemplary embodiments.
Figure 4:
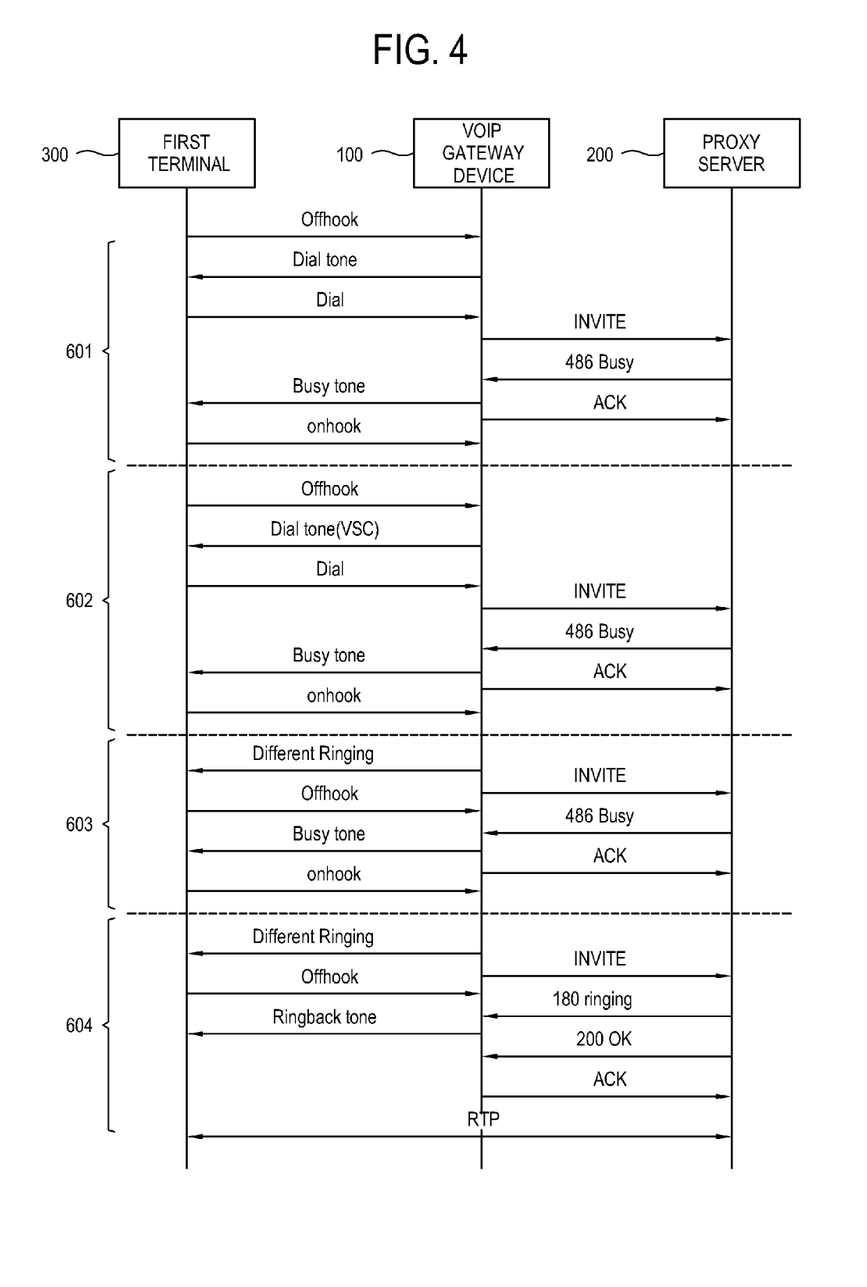
Figure 5:
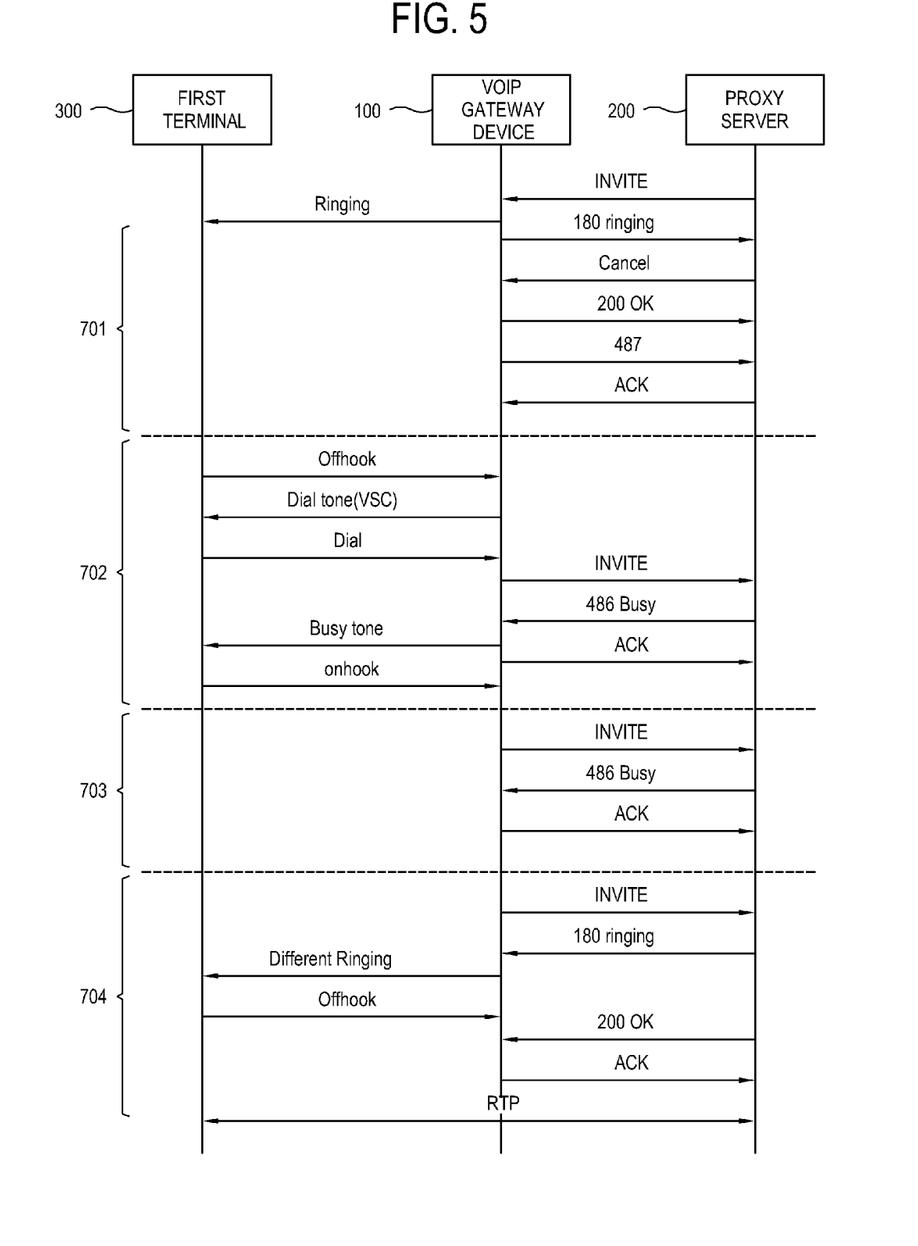
FIGS. 5 and 6 are flowcharts of a call back function for an incoming call to a first terminal according to one or more exemplary embodiments.
Figure 6:
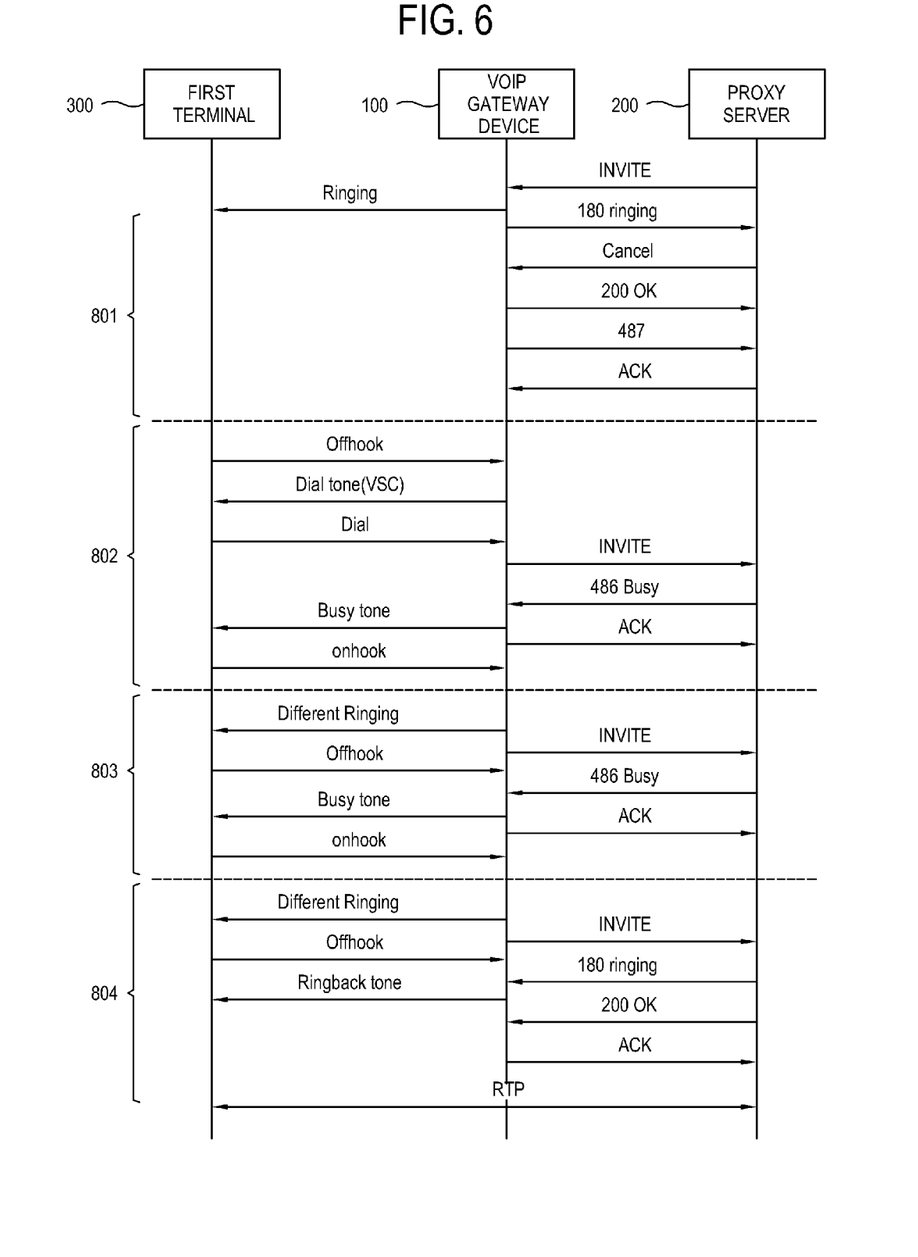

FIGS. 3 and 4 are flowcharts of the call back function for an outgoing call of the first terminal 300 according to one or more exemplary embodiments. FIGS. 5 and 6 are flowcharts for the call back function for an incoming call to the first terminal 300 according to one or more exemplary embodiments.

FIG. 3 illustrates an example in which no message is transmitted to the first terminal 300 if a call is not successfully connected (if a ringing message is not transmitted by the proxy server) upon request from the VoIP gateway device 100 for the call by the call back function in the case where the first terminal 300 requests the call to the second terminal 400.

As shown in FIG. 3, at operation 501, if a user picks up the receiver to request a call through the first terminal 300 (off-hook), the VoIP gateway device 100 transmits a dial tone to the first terminal 300, and the first terminal 300 dials a telephone number. The VoIP gateway device 100 transmits the invite message to the proxy server 200 to connect a call corresponding to the telephone number input by the first terminal 300. The proxy server 200 transmits the invite message to the counterpart terminal (second terminal 400). However, if the call connection fails, e.g., because the second terminal 400 is busy or for other reasons, the second terminal 400 transmits a busy message (e.g., an SIP 486 Busy Here message) to the proxy server 200, and the proxy server 200 transmits the busy message to the VoIP gateway device 100. The VoIP gateway device 100 transmits a busy tone as a ring back tone corresponding to the busy message 486 so that a user recognizes the busy tone and puts down the receiver (on-hook).

If a user makes an outgoing call request but such a call fails at operation 501, the call back function may be registered at operation 502. Thus, a user may pick up the receiver (off-hook) through the first terminal 300, and register the call back function with the VoIP gateway device 100 via the VSC (Dial). The VoIP gateway device 100 transmits an invite message to the proxy server 200 in response to a user's request for the call back function. However, even in this case, upon receiving the busy message from the second terminal 400, the proxy server 200 transmits the message to the VoIP gateway device 100, which transmits a busy tone as a ring back tone corresponding to the busy message so that a user recognizes the busy tone and puts down the receiver (on-hook).

At operation 503, following the default value defined by "FeatureAutoRedialInterval" as in Table 1, the controller 140 does not report to a user and transmits the invite message to the proxy server 200 again in response to a user's request for the call back function, to thereby make a call. Upon receiving the busy message from the proxy server 200 for the invite message, the VoIP gateway device 100 cancels and ends the call. At this operation, the VoIP gateway device 100 makes no report if the call is not sent to the second terminal 400 or the call is sent but not connected, by the call back function.

At operation 504, the controller 140 of the VoIP gateway device 100 transmits to the proxy server 200 the invite message in response to a user's request for the call back function at an interval of the default value defined by "FeatureAutoRedialInterval" in Table 1. The proxy server 200 transmits the invite message to the second terminal 400. Upon receiving a ringing message (e.g., an SIP 180 ringing message) from the second terminal 400, the proxy server 200 transmits the ringing message to the VoIP gateway device 100. The VoIP gateway device 100 transmits a different ringtone with respect to the call received by the call back function, corresponding to the ringing message. By the ringtone corresponding to the call received by the call back function, a user recognizes that the call is in accordance with the call back function as opposed to a general call, and picks up the receiver for the call (off-hook). According to the Real-time Transport Protocol (RTP) session, the first terminal 300 and the second terminal 400 are successfully connected for the call.

FIG. 4 illustrates an exemplary embodiment in which the first terminal 300 requests a call to the second terminal 400. Unlike the exemplary embodiment illustrated in FIG. 3, the exemplary embodiment illustrated in FIG. 4 is a case where a request for the call is reported to the first terminal 300 when the VoIP gateway device 100 requests for the call by the call back function.

As shown in FIG. 4, the operation 601 is similar to the operation 501 in FIG. 3. The operation 602 is similar to the operation 502 in FIG. 3. At operation 603, following the default value defied by "FeatureAutoRedialInterval" in Table 1, the controller 140 of the VoIP gateway device 100 transmits the invite message to the terminal (e.g., the second terminal 400) to which the first terminal 300 desires to connect the call through the proxy server 200 in response to the request for the call back function through the first terminal 300 at operation 602, and transmits to the first terminal 300 the ringtone stored in the storage unit 130 to inform that the call is made to the second terminal 400 by the call back function. The ringtone stored in the storage unit 130 is different from ringtones for general incoming calls, and a user may recognize the ringtone by the call back function. Accordingly, a user picks up the receiver (off-hook). If the counterpart terminal (second terminal 400) is busy with respect to the invite message, the second terminal 400 transmits the busy message to the proxy server 200. The proxy server 200 transmits the busy message 486 to the VoIP gateway device 100. The VoIP gateway device 100 transmits the busy tone to the first terminal 300 corresponding to the busy message. Accordingly, a user puts down the receiver to end the call. At operation 604, the controller 140 transmits the invite message to the proxy server 200 to connect the call in response to the request for the call back function at the interval of the default value defined by "FeatureAutoRedialInterval" in Table 1, and transmits the different ringtone to the first terminal 300 to notify that the call is being sent by the call back function. If a user picks up the receiver listening to the ringtone according to the call back function and receives a ringing message (e.g., an SIP 180 ringing message) corresponding to the invite message from the proxy server 200, the VoIP gateway device 100 transmits the ring back tone to the first terminal 300 to notify the connection of the call. The first terminal 300 and the second terminal 400 are connected for the call by the RTP session to thereby connect the call.

FIG. 5 illustrates an example of transmitting no report message to the first terminal 300 if a call is not successfully connected upon request from the first terminal 300 for the call back function to the VoIP gateway device 100 as the first terminal 300 fails to receive a call request from the second terminal 400.

At operation 701, the invite message of the second terminal 400 is transmitted to the VoIP gateway device 100 through the proxy server 200, and the VoIP gateway device 100 transmits the ringtone corresponding to a general incoming call to the first terminal 300. If the call is not connected due to a user's absence or by other reasons, the second terminal 400 cancels and ends the call. Regarding the call received when a user is absent, if the call back function is requested by the first terminal 300 to the VoIP gateway device 100 according to the VSC, the VoIP gateway device 100 transmits the invite message to the proxy server 200 to connect the call to the second terminal 400 at operation 702. However, even in this case, upon receiving a busy message (e.g., an SIP 486 busy message) from the second terminal 400, the proxy server 200 transmits the message to the VoIP gateway device 100, and transmits the busy tone as a ringtone corresponding to the busy message. A user recognizes the ringtone and puts down the receiver.

At operation 703, the controller 140 transmits the invite message to the proxy server 200 in response to the request for the call back function at the default value defined by "FeatureAutoRedialInterval" in Table 2. Upon receiving the busy message again from the proxy server 200 with respect to the invite message, the VoIP gateway device 100 cancels and ends the call. At this stage, the VoIP gateway device 100 makes no report to the first terminal 300.

At operation 704, the controller 140 of the VoIP gateway device 100 transmits the invite message to the proxy server 200 again according to the call back function at the interval of the default value defined by "FeatureAutoRedialInterval" in Table 2. The proxy server 200 transmits the invite message to the second terminal 400. Upon receiving the ringing message (e.g., an SIP 180 ringing message) from the second terminal 400, the proxy server 200 transmits the ringing message to the VoIP gateway device 100. The VoIP gateway device 100 transmits a different ringtone corresponding to the call received according to the request for the call back function with respect to the ringing message. By the ringtone corresponding to the call received according to the call back function, a user recognizes that such a call is not a call generally received, but received according to the call back function and picks up the receiver (off-hook). The first terminal 300 and the second terminal 400 are successfully connected for the call according to the RTP session.

FIG. 6 illustrates an example of the first terminal's failure to receive the call even though the second terminal 400 requests the call to the first terminal 300. Unlike FIG. 5, however, FIG. 6 illustrates an example of reporting to the first terminal 300 the request for the call when the VoIP gateway device 100 requests the call according to the call back function.

As shown therein, operation 801 is similar to operation 701 in FIG. 5. Operation 802 is similar to operation 702 in FIG. 5.

At operation 803, the controller 140 of the VoIP gateway device 100 transmits the invite message to the terminal (e.g., the second terminal 400) to which the first terminal 300 desires to connect a call through the proxy server 200 at the default value defined by "FeatureAutoRedialInterval" in Table 1 according to the request for the call back function by the first terminal 300 made at operation 802. The controller 140 transmits the different ringtone stored in the storage unit 130 to the first terminal 300 to notify the first terminal 300 that the call is being sent according to the call back function. The ringtone stored in the storage unit 130 is different from a ringtone for general incoming calls, and a user may recognize that such a ringtone is provided according to the call back function and picks up the receiver (off-hook). If the counterpart terminal (the second terminal 400) is busy with respect to the invite message, the second terminal 400 transmits the busy message to the proxy server 200, and the proxy server 200 transmits the busy message 486 to the VoIP gateway device 100. The VoIP gateway device 100 transmits the busy tone to the first terminal 300 corresponding to the busy message, and a user puts down the receiver (on-hook) to end the call. At operation 804, the controller 140 transmits the invite message to the proxy server 200 to connect the call according to the request for the call back function at the interval of the default value defined by "FeatureAutoRedialInterval" in Table 2, and transmits a different ringtone stored in the storage unit 130 to the first terminal 300 to notify that the call is being sent according to the call back function. As the ringtone is provided according to the call back function, a user picks up the receiver (off-hook). Upon receiving the ringing message (e.g., an SIP 180 ringing message) from the proxy server 200 corresponding to the invite message, the VoIP gateway device 100 transmits the ring back tone to the first terminal 300 to notify a user of the connection of the call. The first terminal 300 and the second terminal 400 are successfully connected for the call by the RTP session.

As described above, a VoIP gateway device, a control method thereof, and a VoIP gateway system according to exemplary embodiments provide a call back function without change of software of a proxy server to thereby reduce a load on the proxy server.

Also, the VoIP gateway device, the control method thereof, and the VoIP gateway system according to the exemplary embodiments provide not only a call back function for a failure to request an outgoing call but also a call back function for a failure to receive an incoming call.

Further, the VoIP gateway device, the control method thereof, and the VoIP gateway system according to exemplary embodiments provide a ringtone that is distinguishable from a ringtone for a call generally received to thereby enhance a user's convenience.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, one or more of the above-described units, terminals, servers, etc., can include a processor or microprocessor executing a computer program stored in a computer-readable medium.

Although a few exemplary embodiments have been shown and described, it will be appreciated by those skilled in the art that changes may be made in these exemplary embodiments without departing from the principles and spirit of the present inventive concept, the range of which is defined in the appended claims and their equivalents.

What is claimed is:

1. A Voice over Internet Protocol (VoIP) gateway device comprising:
   a connector which connects to a first terminal;
   a communication unit which communicates with a proxy server that relays a VoIP communication between the first terminal and a second terminal;
   a controller which transmits, to the proxy server, an invite message for connecting a call, corresponding to a call back function, to the second terminal in response to a request from the first terminal for the call back function; and a storage unit which stores a ringtone specifically corresponding to a call received by the call back function,
   wherein the call back function is a function by which one or more repeated attempts at a predetermined interval while the second terminal is busy to connect a call from the first terminal to the second terminal are automatically made after an initial attempt to initially connect the call from the first terminal to the second terminal fails,
   wherein the controller transmits the stored ringtone to the first terminal in response to receiving, from the proxy server, a ringing message corresponding to the invite message, and wherein the controller does not transmit any message to the first terminal in response to receiving, from the proxy server, a busy message in response to the invite message, after the predetermined interval.

2. The VoIP gateway device according to claim 1, wherein the call back function is a function that is requested by the first terminal in response to a call connection requested by the first terminal to the second terminal failing.

3. The VoIP gateway device according to claim 1, wherein the call back function is a function that is requested by the first terminal in response to a call connection not being made as a result of a failure of the first terminal to respond to a request made by the second terminal for the call connection.

4. The VoIP gateway device according to claim 1, wherein the stored ringtone is different from a ringtone corresponding to a call generally received by the first terminal.

5. The VoIP gateway device according to claim 1, wherein the controller does not transmit any message to the first terminal if the controller does not receive, from the proxy server, the ringing message in response to the invite message.

6. The VoIP gateway device according to claim 1, wherein the controller transmits the stored ringtone to the first terminal to report that the call back function is being performed when the invite message is transmitted to the proxy server.

7. A VoIP system comprising:
a proxy server which relays a VoIP communication between a first terminal and a second terminal;
and a VoIP gateway device which comprises:
a connector which connects to the first terminal,
a communication unit which communicates with the proxy server,
a controller which transmits, to the proxy server, an invite message to connect a call, corresponding to a call back function, to the second terminal in response to a request from the first terminal for the call back function,
and a storage unit which stores a ringtone specifically corresponding to a call received by a call back function,
wherein the call back function is a function by which one or more repeated attempts at a predetermined interval while the second terminal is busy to connect a call from the first terminal to the second terminal are automatically made after an initial attempt to initially connect the call from the first terminal to the second terminal fails,
wherein the controller transmits the stored ringtone to the first terminal in response to receiving, from the proxy server, a ringing message corresponding to the invite message, and wherein the controller does not transmit any message to the first terminal in response to receiving, from the proxy server, a busy message in response to the invite message, after the predetermined time interval.

8. The VoIP system according to claim 7, wherein the call back function is requested by the first terminal in response to a call connection requested by the first terminal to the second terminal failing.

9. The VoIP system according to claim 7, wherein the call back function is requested by the first terminal in response to a call connection not being made as a result of a failure of the first terminal to respond to a request for the call connection by the second terminal.

10. The VoIP system according to claim 7, wherein the stored ringtone is different from a ringtone corresponding to a call generally received by the first terminal.

11. The VoIP system according to claim 7, wherein the controller does not transmit any message to the first terminal if the controller does not receive, from the proxy server, the ringing message in response to the invite message.

12. The VoIP system according to claim 7, wherein the controller transmits the stored ringtone to the first terminal to report that the call back function is being performed when the invite message is transmitted to the proxy server.

13. A control method of a VoIP gateway device, the control method comprising:
storing a ringtone corresponding to a call received by a call back function;
transmitting, to a proxy server that relays a VoIP communication between a first terminal and a second terminal, an invite message to connect a call, corresponding to the call back function, to the second terminal in response to a request from the first terminal for the call back function;
transmitting the stored ringtone to the first terminal in response to receiving, from the proxy server, a ringtone message corresponding to the invite message;
wherein the call back function is a function by which one or more repeated attempts at a predetermined interval while the second terminal is busy to connect a call from the first terminal to the second terminal are automatically made after an initial attempt to initially connect the call from the first terminal to the second terminal fails,
and transmitting no message to the first terminal in response to receiving, from the proxy server, a busy message in response to the invite message, after the predetermined interval.

14. The control method according to claim 13, wherein the call back function is requested by the first terminal in response to a call connection requested by the first terminal to the second terminal failing.

15. The control method according to claim 13, wherein the call back function is requested by the first terminal in response to a call connection not being made as a result of a failure of the first terminal to respond to a request made by the second terminal for the call connection.

16. The control method according to claim 13, wherein the stored ringtone is different from a ringtone corresponding to a call generally received by the first terminal.

17. The control method according to claim 13, wherein no message is transmitted from the VoIP gateway device to the first terminal if the ringing message is not received from the proxy server in response to the invite message.

18. The control method according to claim 13, further comprising transmitting the stored ringtone to the first terminal to report that the call back function is being performed when the invite message is transmitted to the proxy server.

19. A control method of a VoIP gateway device, the control method comprising:
receiving, by the VoIP gateway device, a request from a first terminal for a call back function;
transmitting, to a proxy server that relays a VoIP communication between the first terminal and a second terminal, an invite message to connect a call, corresponding to the call back function, to the second terminal in response to the received request;
wherein the call back function is a function by which one or more repeated attempts at a predetermined interval while the second terminal is busy to connect a call from the first terminal to the second terminal are automatically made after an initial attempt to initially connect the call from the first terminal to the second terminal fails;
transmitting a ringtone to the first terminal in response to receiving, from the proxy server, a ringing message corresponding to the invite message;
and transmitting no message to the first terminal in response to receiving, from the proxy server, a busy message in response to the invite message, after the predetermined interval.

20. The control method according to claim 19, wherein the call back function is requested by the first terminal in response to a call connection requested by the first terminal to the second terminal failing.

21. The control method according to claim 19, wherein the call back function is requested by the first terminal in response to a call connection not being made as a result of a failure of the first terminal to respond to a request made by the second terminal for the call connection.

22. A non-transitory computer readable recording medium having recorded thereon a program executable by a computer for performing the method of claim 13.

23. A non-transitory computer readable recording medium having recorded thereon a program executable by a computer for performing the method of claim 19.

24. The VoIP gateway device according to claim 1, wherein the call back function is a function that if a first signal from the VoIP gateway device to the proxy server to connect the call between the first terminal and the second terminal fails, a second signal to connect the call is transmitted from the VoIP gateway device to the proxy server.

25. The VoIP gateway device according to claim 24, wherein the second signal is transmitted at the predetermined interval.

26. The VoIP gateway device according to claim 1, wherein the controller transmits a busy tone to the first terminal in response to receiving, from the proxy server, a first busy message corresponding to the invite message, and the controller does not transmit any message to the first terminal in response to receiving, from the proxy server, the busy message, subsequent to the first busy message, in response to the invite message.

* * * * *